United States Patent
Killick et al.

(10) Patent No.: US 11,159,852 B1
(45) Date of Patent: Oct. 26, 2021

(54) DYNAMIC CONTENT INSERTION IN CLOUD-STORED RECORDED ASSETS

(71) Applicant: Cox Communications, Inc., Atlanta, GA (US)

(72) Inventors: Ray Killick, Alpharetta, GA (US); Jayasri Devalapalli, Alpharetta, GA (US); Muhammad Asif Raza, Norcross, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 0 days.

(21) Appl. No.: 16/673,323

(22) Filed: Nov. 4, 2019

(51) Int. Cl.
| | | |
|---|---|---|
| *H04N 21/472* | (2011.01) | |
| *H04N 21/231* | (2011.01) | |
| *H04N 21/234* | (2011.01) | |
| *H04N 21/431* | (2011.01) | |
| *H04N 21/81* | (2011.01) | |

(52) U.S. Cl.
CPC . *H04N 21/47202* (2013.01); *H04N 21/23113* (2013.01); *H04N 21/23418* (2013.01); *H04N 21/23424* (2013.01); *H04N 21/4314* (2013.01); *H04N 21/812* (2013.01)

(58) Field of Classification Search
None
See application file for complete search history.

(56) References Cited

U.S. PATENT DOCUMENTS

| | | | | |
|---|---|---|---|---|
| 2011/0135283 A1* | 6/2011 | Poniatowki | ...... | H04N 21/47217 386/297 |
| 2012/0288259 A1* | 11/2012 | Gilson | ...... | H04N 5/782 386/296 |
| 2014/0020017 A1* | 1/2014 | Stern | ...... | H04N 21/2747 725/34 |
| 2018/0041812 A1* | 2/2018 | Brown | ...... | H04L 65/4084 |
| 2018/0270534 A1* | 9/2018 | Badawiyeh | ...... | H04N 21/472 |

* cited by examiner

*Primary Examiner* — Rong Le

(74) *Attorney, Agent, or Firm* — Merchant & Gould P.C.

(57) ABSTRACT

Dynamic ad insertion in cloud-based video recorded (cDVR) content is provided. A partially or fully recorded cDVR asset may be associated with a corresponding reference asset, such as a video-on-demand (VOD) catalog copy of a program. The cDVR asset and reference asset may be associated via a common identifier, such as a TMS or Gracenotes® identifier. The reference asset may include metadata that specifies ad breaks and that can be applied to the cDVR asset and used to dynamically insert up-to-date and relevant ads into those ad breaks during playback. Additionally, an option may be provided to a user to stream the reference asset instead of the recorded asset. Further, another option may be provided to replace the user's cDVR asset with the reference asset. Accordingly, up-to-date and relevant ads can be dynamically inserted into the reference asset on playback, and less storage space is required for storing the recording.

14 Claims, 7 Drawing Sheets

DYNAMIC CONTENT INSERTION IN CLOUD-STORED RECORDED ASSETS

BACKGROUND

A digital video recording (DVR) service is a technology that enables consumers of the service (e.g., customers/subscribers of a multiple-system operator (MSO)) to record linear video content (e.g., television shows, movies) and to playback the content at a later time. In some examples, the video content is recorded locally on a client device's hard drive. In other examples, the video content is recorded in the cloud (e.g., stored on a server in a network). In addition to requiring less or no local storage, another benefit of using a cloud-based video recorder/recording (cDVR) is remote access to cDVR recordings on portable or other devices when streaming away from home.

According to an aspect, when a subscriber selects to record a linear video asset using a cDVR service, a unique/exclusive copy of the video content may be made and stored for the subscriber. For example, storing an exclusive cDVR recording for the subscriber may be based on Federal Communications Commission (FCC) rules that ensure that a subscriber who has paid for a DVR/cDVR service can access recorded content as long as the subscriber remains a subscriber of an associated video service provider and of the DVR/cDVR service. When a linear video content asset is recorded, various advertisements (ads) that were aired at the time of broadcast may also be recorded. Currently, cDVR recordings are limited to these recorded ads. For example, a subscriber may record a television show including an ad break featuring a commercial for a particular product, service, event, etc. Each time when the subscriber selects to watch the recorded television show in the future (e.g., five minutes later, one day later, four months later, two years later), the same commercial may be played back. As can be appreciated, this can provide an unfair benefit to the advertiser who likely paid for ad placement according to an agreed-on time period but whose baked-in ad may be played in perpetuity until the subscriber deletes the recording. Moreover, for various reasons, some advertisements may be relevant for a limited time. Accordingly, when a cDVR recording is played back in the future, the included recorded ads may be out-of-date, irrelevant, or otherwise inapplicable to the viewer.

SUMMARY

Aspects of the present disclosure provide systems and methods for providing dynamic ad insertion in cloud-based video recorded (cDVR) content. According to an aspect, a cDVR content item may be associated with a corresponding reference asset, such as a video-on-demand (VOD) catalog copy of the content. For example, reference assets may include metadata that specifies ad breaks that can be used by a content provider to dynamically insert ads into those ad breaks during playback.

In some example aspects, when a user invokes playback of a cDVR content item, the user may be presented with an option to view the corresponding reference asset rather than the cDVR item. For example, the cDVR content item may be a partial recording (e.g., recording started late, recording ended early), wherein being provided with the option to view the corresponding reference asset may allow the user is enabled to view a complete show, rather than the portion that was recorded in the partial cDVR recording. Additionally, dynamic ad insertion (DAI) may be applied to the reference asset, which may allow for advertisements to be dynamically inserted into the reference asset upon playback. The inserted ads may be associated with advertising agreements between advertisers and the service provider that may specify a number of times for an ad to run, time slots during which an ad is to run, payment terms, etc. Thus, the service provider is enabled to receive compensation for the ads viewed by users in the equivalent reference asset. Further, the inserted ads may be targeted to the user based on customer profile data. Accordingly, current and relevant ad campaign assets may be presented to the user, which may increase the effectiveness of the ads. In some examples, analytics and measurement tools may be used to gauge the effectiveness of the ads for various parties involved in an ad campaign.

In an example aspect, if the user selects the option to view the corresponding reference asset rather than the cDVR item, the user may be presented with another option to replace the cDVR recording (e.g., which, as described in the Background Section, is a unique/exclusive stored copy of the content) with the reference asset. If the user opts for asset replacement, a Uniform Resource Locator (URL) of the reference asset may be persisted in the user's cDVR folder and the user's unique/exclusive stored copy may be deleted. By replacing the stored cDVR recording with the reference asset URL, the amount of cDVR storage space needed for the content is reduced (e.g., storage of bytes of data (URL) versus gigabytes of data (recorded asset)). Accordingly, if there are storage limits associated with the user's cDVR folder, the user may be enabled to record and store more video assets. Or, the service provider may be enabled to reduce the amount of storage resources needed for cDVR folders. Additionally, each time the reference asset is played, up-to-date relevant ads may be inserted and viewed by the user.

In another example aspect, when a user opts for playback of a cDVR recording, content metadata and ad break metadata associated with the corresponding reference asset can be applied to the cDVR recording. For example, the ad break metadata may define various ad breaks in the reference asset, which when applied to the cDVR recording, may define various ad breaks in the cDVR recording. An ad decision may be determined for the ad breaks in the cDVR recording. The ad decision may be based customer profile data, which enables targeted ads to be selected for and presented to the user. Based on the ad decision, an ad playlist may be generated that includes URLs of various ads selected to be including in the playback of the cDVR recording. A consolidated playlist including the cDVR recording's content playlist and the ad playlist may be generated and provided to the user's cDVR folder, and a URL to the consolidated playlist may be transmitted to the user's client device. The client device may be configured to use the consolidated playlist URL to access the consolidated playlist and stream the user's cDVR recording content from the user's cDVR folder according to the content playlist and the various ads from an ad content CDN (Content Delivery Network) according to the ad playlist.

Aspects of the present disclosure enable dynamic ad insertion technology to be applied to cDVR recordings, which, among other benefits described above and in the Detailed Description, provides service providers a method by which they can enforce placements of ads in cDVR content according to advertising agreements. Accordingly, service providers can be compensated for the playback of ads in cDVR recordings, and advertisers can be assured that current and relevant advertisements are being delivered to users.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

Further features, aspects, and advantages of the present disclosure will become better understood by reference to the following figures, wherein like reference numbers indicate like elements throughout the several views.

DETAILED DESCRIPTION

Figure 1:
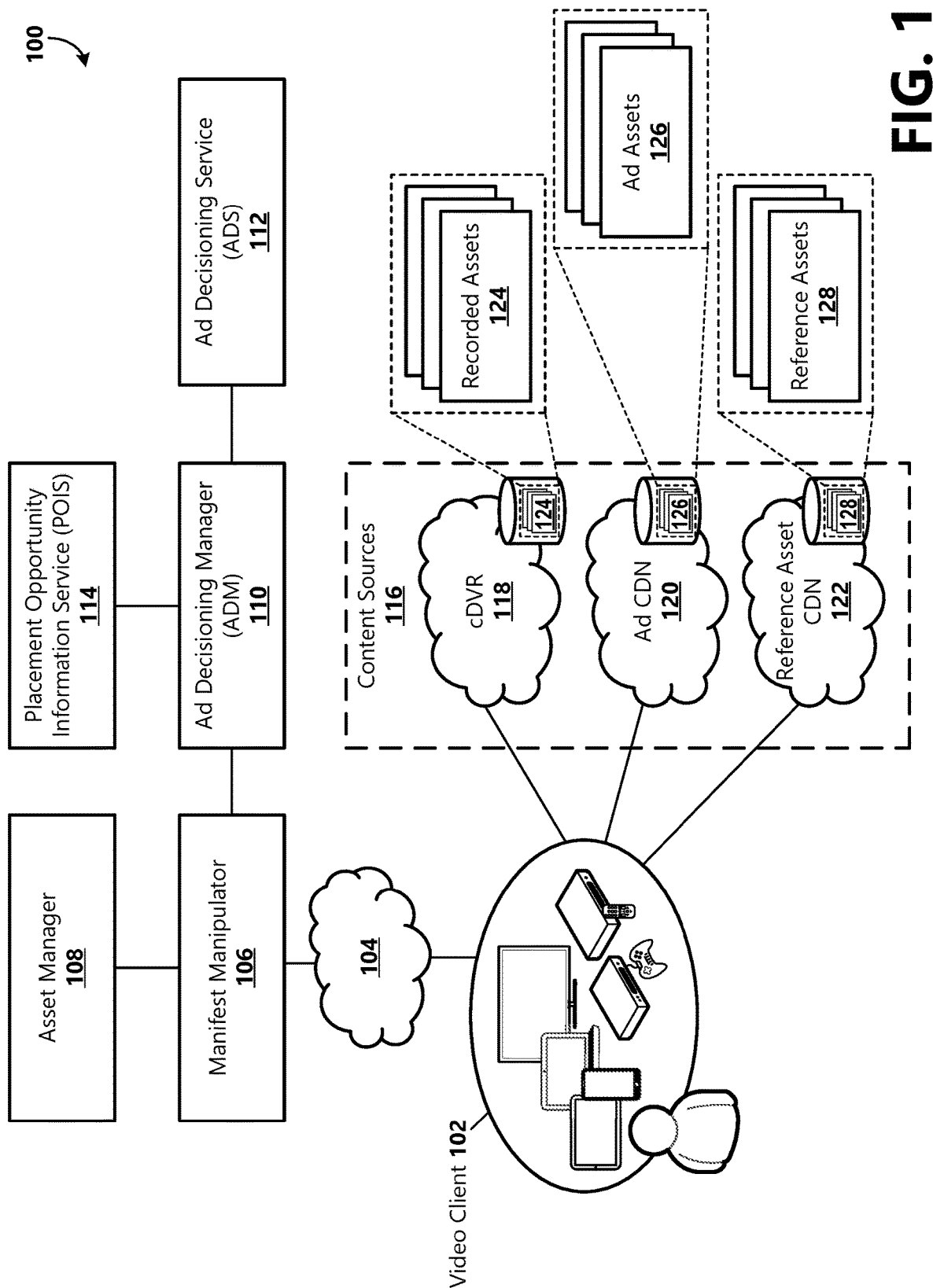
FIG. 1 is a block diagram of an example operating environment in which a system can be implemented for providing dynamic ad insertion in cloud-stored digitally-recorded content according to an embodiment.
Figure 7:
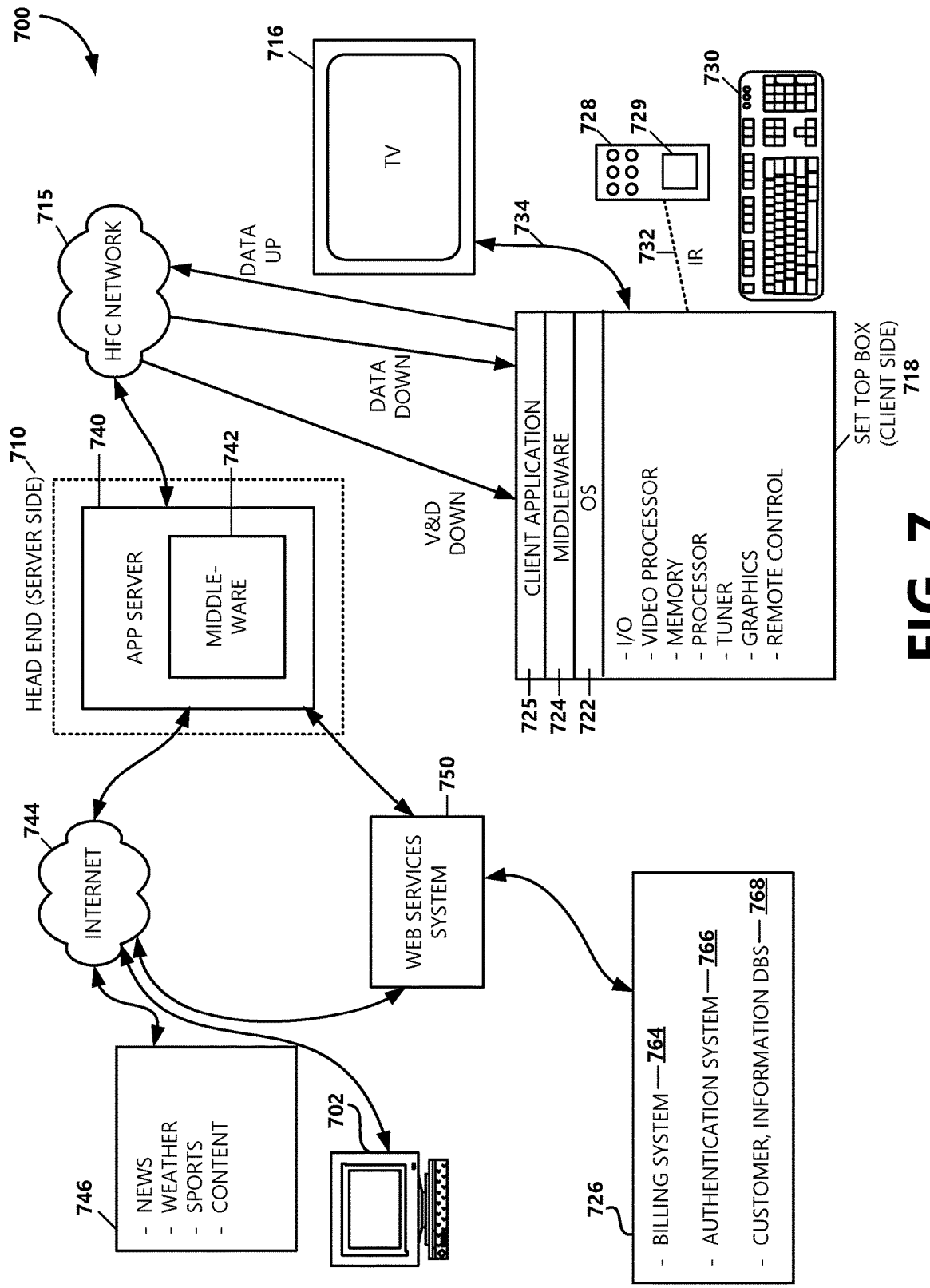
FIG. 7 is a block diagram illustrating components of a cable services system architecture providing an example operating environment according to aspects of the present disclosure.

Aspects of the present disclosure provide dynamic ad insertion in a cDVR (cloud-based Digital Recorder) system via associating a requested cDVR video content item with a corresponding reference video content item. FIG. 1 is a block diagram of an example operating environment in which a system for providing dynamic insertion of advertisements (ads) in cDVR assets can be implemented according to an embodiment. The example operating environment illustrated in FIG. 1 represents components that may be used in conjunction with a network 104 or a combination of networks (e.g., the Internet, an intranet, an extranet, local-area networks, wide-area networks, fiber-coax networks, public switched telephone networks, global telephone networks) to link subscriber clients 102 with content sources 116 to provide content. An example cable television (CATV) architecture that can serve as one example of a network via which aspects of the disclosure can operate is illustrated in FIG. 7 and is described below.

Content sources 116 may include a reference asset content delivery networks (CDN) 122, an ad CDN 120, and a cDVR system 118. Each of the content sources 116 may include one or more content data storage devices and computing devices operative to store, manage, and provide content to subscribers of a service provider. The reference asset CDN 122 may include a plurality of reference assets 128. As used herein, the term "reference asset" describes a television (TV) show, movie, or other video content item that may be part of an existing VOD (Video on Demand) catalog offered to end users. For example, a reference asset 128 may be an equivalent asset to a video content item stored in a user's cDVR folder. A reference asset 128 may be stored in a specific folder of the VOD catalog which the particular video client user may or may not be entitled to access according to the user's subscription with the service provider. As will be described further below, aspects of the present disclosure may provide an entitlement to a video client user that allows the user to access and stream a reference asset 128 corresponding to a video content item stored in the user's cDVR folder. A reference asset 128 may include baked-in ads and/or specified ad breaks, or may have associated metadata that describe ad break insertion points in the asset. According to an aspect, each reference asset 128 may be segmented into a plurality of reference asset segments, and each reference asset segment may be stored in the reference asset CDN 122 as a plurality of reference asset files. In an example aspect, the reference asset files may be stored as MPEG transport stream (.ts) files.

The cDVR system 118 may include computer readable storage media on which video assets (e.g., broadcast TV shows or movies) may be recorded in response to a user's request to record content. The recorded video assets may herein be referred to as recorded assets 124 or cDVR assets. According to an aspect, a recorded asset 124 can include partially-recorded video content (e.g., wherein a portion of the broadcast TV show or movie is recorded) or fully-recorded video content (e.g., the broadcast TV show or movie is recorded is recorded in its entirety). According to an aspect, each recorded asset 124 may be stored as a playlist (i.e., recorded asset playlist) that is in an Internet Protocol (IP) format (e.g., HTTP Live Streaming (HLS), Dynamic Adaptive Streaming over HTTP (DASH or MPEG-DASH)) in the cDVR system 118. For example, a recorded asset playlist may include a plurality of MPEG transport stream (.ts) file links referencing a plurality of recorded asset segments and a plurality of ad asset segments.

The ad CDN 120 may include a plurality of advertisements (herein referred to as ad assets 126) that may be accessed and pulled for insertion into a video content item (e.g., reference assets 128, recorded assets 124). According to an aspect, each ad asset 126 may be segmented into a plurality of ad asset segments, and each ad asset segment may be stored in the ad CDN 120 as a plurality of ad asset files. In an example aspect, the ad asset files may be stored as MPEG transport stream (.ts) files.

In various aspects, the video client 102 is illustrative of a software application, module, system, or device that is operative or configured to provide an interface by which a user can interact with various components of the cDVR DAI system 100, for example, to request to record video content items, to request to playback recorded assets 124 or reference assets 128, to stream recorded assets, reference assets, and ad assets 126, and to control playback of the assets. The video client 102 may be executed on a client device, such as a set top box (STB), a television (TV), a Digital Video Recorder (DVR), a computer (e.g., desktop, laptop, tablet, mobile phone, or personal media server), an over-the-top (OTT) device, a video game system, etc. Non-limiting examples of client devices that may be configured to execute a video client 102 are illustrated in FIGS. 5, 6A, 6B, and 7 and are described below. A video client 102 may be configured to receive content (e.g., recorded asset 124, reference asset 128, ad asset 126) via a variety of mechanisms, including, for example, streaming media over the Internet. The content may be provided to the video client 102 in a plurality of asset segments. The video client 102 may be configured to display the content to a user by sequentially rendering the segments of the content on an audio/visual output interface integrated in or connected to the video client. A given user may user more than one video client 102 to access components of the cDVR DAI system 100. For example, the user may use a first video client 102, such as a STB, to request to record a content item (e.g., select an option to record the content item while viewing the content item, schedule a recording from an electronic program guide), and then use a second video client 102, such as a dedicated application or web interface executing on a mobile computing device, to request to playback the recorded asset 124. In example aspects, the user may log into the video clients with an associated profile. For example, the profile may be associated with the user's service provider account information (e.g., access permissions, parental policies, storage space, recording and retention preferences) and the user's cDVR folder.

When a user requests to record a content item, the cDVR system 118 may be configured to receive and store the content in cDVR storage, and associate the recorded asset 124 with the consumer for later retrieval. A recorded asset 124 playlist corresponding to the recorded asset segments comprising the recorded asset may be stored by the cDVR system 118. According to an aspect, the recorded asset 124 may include one or more baked-in ads (e.g., ads aired during ad breaks in the content when the content was broadcast). As mentioned above, the recorded asset 124 may be a unique/exclusive stored copy of the content, and, depending on when the recording started and stopped, may be a partial recording or a full recording. According to another aspect, the recorded asset 124 includes a unique identifier that may be known and recorded based on electronic program guide data. The unique identifier may be known as a TMS (Tribune Media Services) ID or a Gracenote® ID, and may be referred to herein as a common identifier or common ID. The common ID may be used to link TV programs and movies to TV schedule data and on-demand catalogs, which may enable users to search for and find their favorite shows, set DVR season passes, and find related programs. According to an aspect of the present disclosure and as will be described in further detail, the common ID may be used to link a recorded asset 124 to a reference asset 128, which enables ad breaks in the reference asset to be mapped to and applied to the recorded asset for enabling ads to be dynamically inserted into viewed recorded assets.

When a user requests to view a recorded asset 124, the request may be transmitted to a manifest manipulator 106 illustrative of a software application, module, system, or device that is operative or configured to manage requests for recorded asset 124 playback from video clients 102. According to an aspect, the manifest manipulator 106 may be operable to manipulate recorded assets 124 and reference assets 128 and ad playlists to produce a consolidated playlist or manifest file for an end user streaming application (e.g., video client 102). In an example aspect, the request may include a link to the recorded asset 124, the common ID of the recorded asset, the recording start time, the recording end time, and a video client/client device ID. Additional information may be included. The manifest manipulator 106 may be further configured to request ad decisions for recorded assets and to generate consolidated master playlists that include a playlist for the recorded assets 124 and a playlist for ad assets 126 associated with the ad decisions. For example, a video client 102 can access and use a master playlist to stream a requested recorded asset 124 and various ad assets 126 that have been selected for insertion in the recorded asset.

Figure 2:
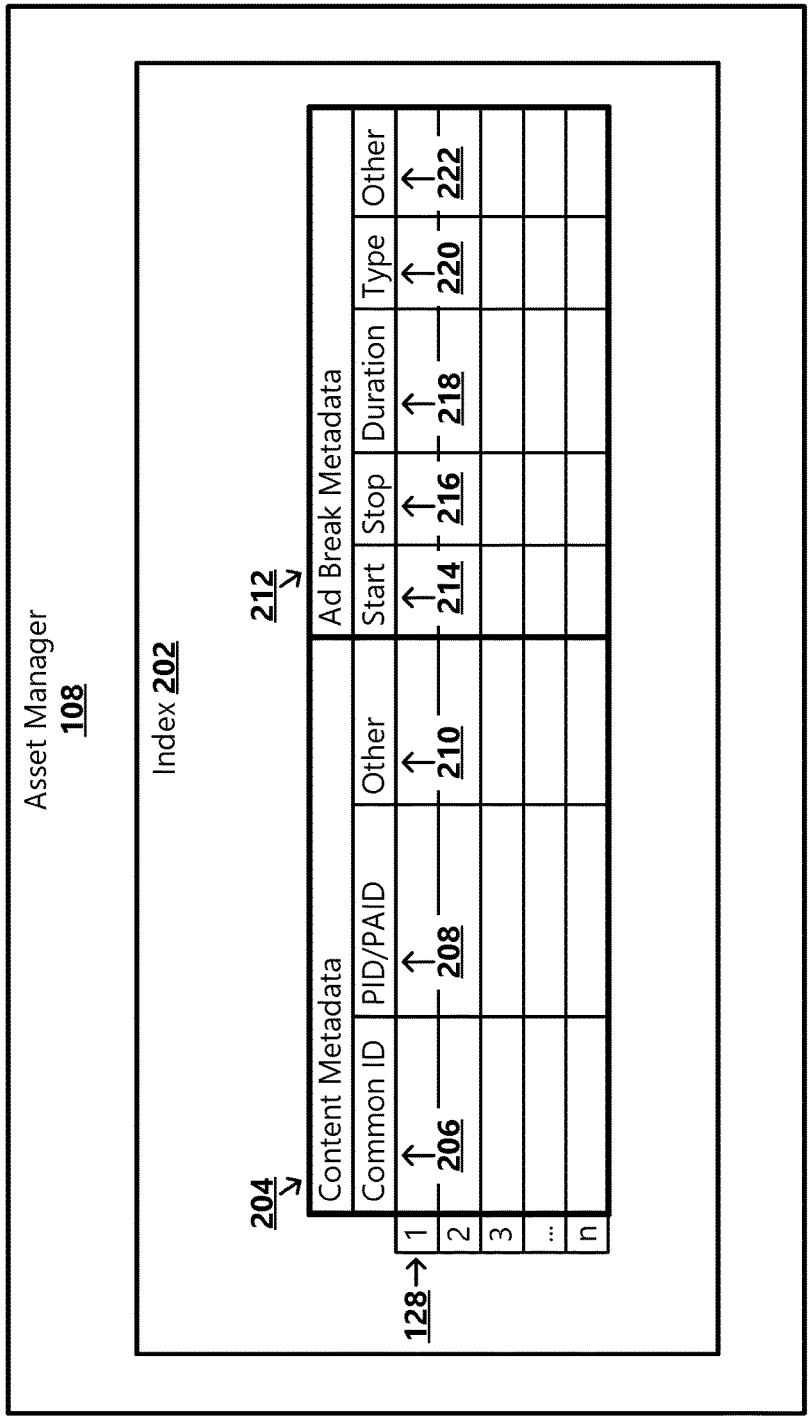
FIG. 2 is a block diagram showing example metadata that may be stored for a reference asset and used to dynamically insert ads in cloud-stored digitally-recorded content.

The asset manager 108 is illustrative of a software application, module, system, or device that is operative or configured to store metadata for reference assets 128. With reference to FIG. 2, an example index 202 that may be managed by the asset manager 108 is illustrated. For example, the index 202 may store content metadata 204 and ad break metadata 212 about a reference asset 128. Content metadata 204 may include the common ID 206, a provider ID (PID) and/or a provider asset ID (PAID) (PID/PAID 208), and other metadata 210 about the reference asset, such as title information, content category information (e.g., comedy, romance, drama, news, horror, sports), rating information (e.g., G, PG, PG-13, R), a description of the reference asset, a URL/URLs of the reference asset, etc. The ad break metadata 212 may include information that signals the start and length of ad breaks included in the reference asset 128, such as starting points 214, stopping points 216, and the ad break durations 218. Ad break metadata 212 may further include information indicating an ad break type 220 (e.g., local or national) and other metadata 222 about the ad breaks in a reference asset 128.

In an example aspect, the manifest manipulator 106 may be configured to use the common ID 206 received from a video client 102 in a request for playback of a recorded asset 124 to query the asset manager 108 for the PID/PAID 208 of a reference asset 128 corresponding to the recorded asset 124 for which playback has been requested. For example, a reference asset 128 may be a video-on-demand (VOD) catalog copy of the same program content (e.g., television show, movie) of a recorded asset 124, wherein the recorded asset may be a fully or partially recorded copy of the program content and the reference asset 128 may be a complete copy of the program content and may exist in a VOD catalog (e.g., part of the reference asset CDN 122). As described above, reference assets 128 comprise content metadata 204 and ad break metadata 212 that specify ad breaks that can be used by a content provider to dynamically insert ads into those ad breaks during playback.

In some example aspects, when a user invokes playback of a recorded asset 124, the manifest manipulator 106 may be configured to present the user with an option to view a reference asset 128 corresponding to the same common ID 206 as the requested recorded asset 124 rather than viewing the recorded asset. For example, the recorded asset 124 may be a partial recording (e.g., recording started late, recording ended early). A user may opt to view the reference asset 128 rather than the recorded asset 124 so that he/she may watch a complete show rather than a portion that was recorded in the recording (e.g., if the recorded asset 124 is a partial recording). If the user selects to watch the reference asset 128, a URL to a playlist for the reference asset may be sent to the video client 102, and the video client may use the URL to stream the reference asset segments and inserted ad asset segments for display to the user. For example, DAI may be applied to the reference asset 128, which may allow for ad assets 126 to be dynamically inserted into the reference asset upon playback. The inserted ads (i.e., ad assets 126) may be associated with advertising agreements between advertisers and the service provider that may specify a number of times for an ad to run, time slots during which an ad is to run, payment terms, etc. Thus, the service provider is enabled to monetize the ad assets 126 viewed by users in the corresponding reference asset 128. Further, the inserted ad assets 126 may be targeted to the user based on customer profile data. Accordingly, current and relevant ad campaign assets may be presented to the user, which may increase the effectiveness of the ads. In some examples, analytics and measurement tools may be used to gauge the effectiveness of the ad assets 126 for various parties involved in an ad campaign.

In an example aspect, if the user selects to watch the reference asset 128, a second option may be communicated to the user to replace the user's recorded asset 124 with the reference asset 128. If the user opts for asset replacement, the link (e.g., URL) to the reference asset 128 may be persisted in the user's cDVR folder (e.g., cDVR system 118), and the recorded asset 124 may be deleted. By replacing the stored recorded asset 124 with the link to the reference asset 128, the amount of storage space in the cDVR system 118 needed for storing the content is reduced (e.g., storage of bytes of data (URL) versus gigabytes of data (recorded asset 124)). Accordingly, if there are storage limits associated with the user's cDVR folder, replacing the recorded asset 124 with the link to the reference asset 128 may enable the user to record and store more/other content. Or, the service provider may be enabled to reduce the amount of storage resources needed in the cDVR system 118. Further, if the reference asset 128 expires (e.g., goes out of its license window), prior to an expiration date of the reference asset's license window, a copy of the reference asset 128 may be stored in the user's cDVR folder (e.g., cDVR system 118), and the link to the reference asset 128 may be deleted. For example, the copy of the reference asset 128 may be subject for lifecycle management agreement between the service provider or distributor and the user.

With reference again to FIG. 1, the ad decisioning manager (ADM) 110 is illustrative of a software application, module, system, or device that is operative or configured to receive and respond to requests for ad decisions from the manifest manipulator 106. For example, the ADM 110 may be configured to receive a request from the manifest manipulator 106 for an ad decision for the ad breaks identified in a reference asset 128 corresponding to a requested recorded asset 124 based on the ad break metadata 212 associated with the reference asset. As part of making an ad decision for an ad decision response, the ADM 110 may be configured to call a placement opportunity information service (POIS) 114 for requesting placement opportunity-related information and an ad map for the corresponding reference asset 128. The POIS 114 may be invoked by the ADM 110 to retrieve information about the location and rights associated with alternate content opportunities within the reference asset 128 for the insertion of ad assets 126. This retrieved information may be referred to as placement opportunity regions (PORs). For example, the POIS 114 may be configured to provide attributes and constraints for each placement opportunity in the reference asset 128, which may include pre-roll ad breaks, mid-roll ad breaks, and post-roll ad breaks. The attributes and constraints may define which platforms may be used, ownership rights, policies that may be used to coordinate the placement of ad assets, etc. As an example, attributes and constraints for each placement opportunity may include a specification of a number of ads that can be placed in a particular ad break, an allowed duration of the ads, whether an ad break is designated for local ads or national ads, and other ad placement rules. Placement opportunities may be content-specific. Accordingly, the placement opportunities can vary based on the type of network, geographic location, or other associated content attributes.

Figure 3:
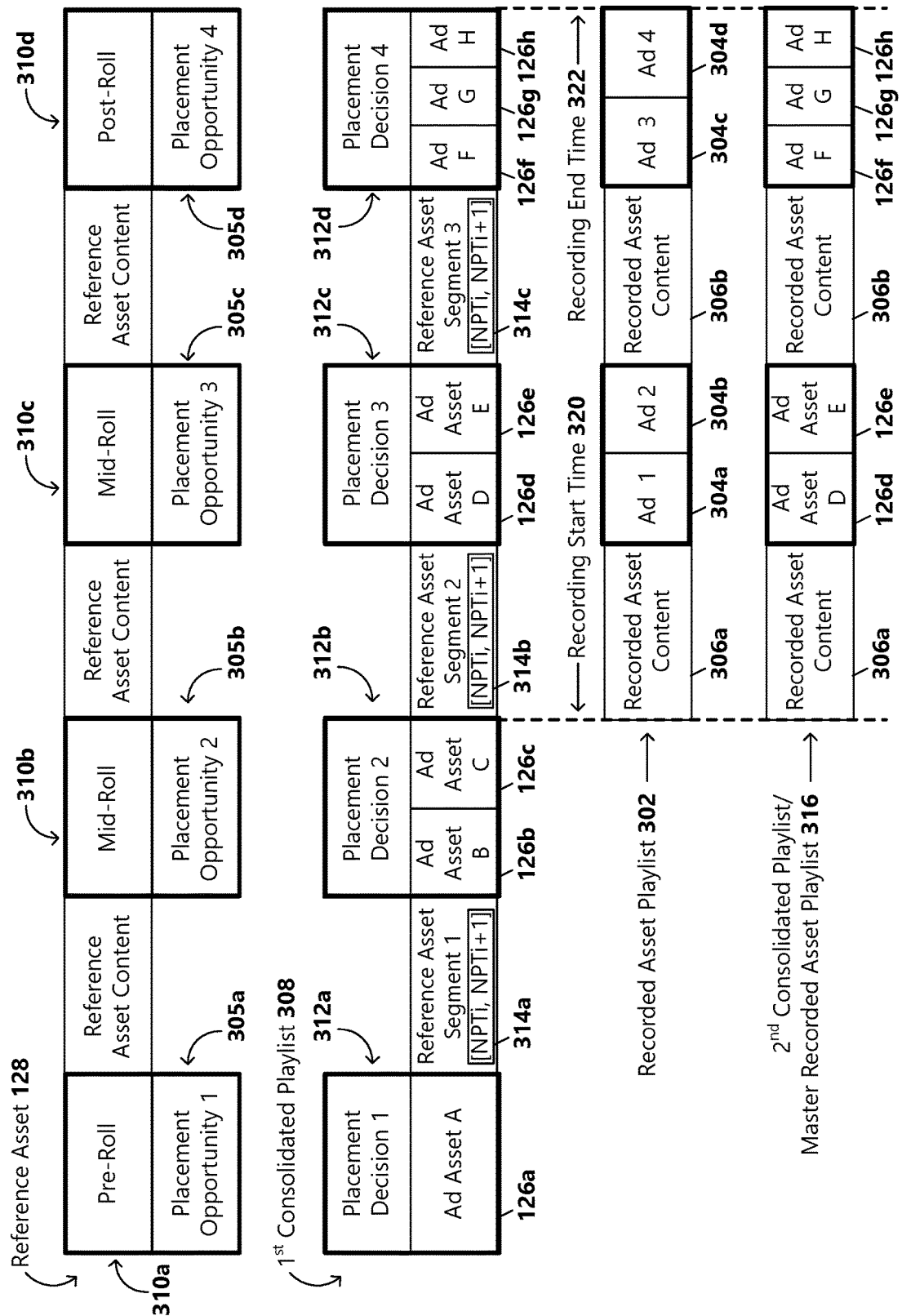
FIG. 3 is a block diagram illustrating an example master playlist generated for playback of a cloud-stored digitally-recorded content item based on a recorded playlist for the content item and a first consolidated playlist generated for a corresponding reference asset.

According to an aspect, the ADM 110 may be further configured to interface an ad decisioning service (ADS) 112 for requesting an ad decision for the reference asset 128. For example and with reference to FIG. 3, the ADM 110 may be configured to map ad breaks 310*a-d* (generally 310) (e.g., pre-roll ad breaks, mid-roll ad breaks, post-roll ad breaks) in the reference asset 128 to the PORs 305*a-d* received from the POIS 114 and to request ad decisions for the ad breaks. Responsive to the ADM 110 sending a request message to the ADS 112 including PORs 305*a-d* and attributes and constraints corresponding to the ad breaks 310*a-d* identified in the reference asset 128, the ADS may determine ad placement decisions 312*a-d* for the PORs 305*a-d* based on any requirements, guidance, and targeting criteria (i.e., attributes and constraints) provided in the request.

In an example aspect, ad placement decisions 312 may be based on a targeted audience segment. For example, based on the content metadata 204 about the reference asset 128, one or more ads that are determined to be relevant to the reference asset may be selected for a POR 305. In another example aspect, an ad placement decision 312 may be further based on the user and/or client device. For example, user profile information, geographic location, and/or metadata about the video client 102 and/or device via which the user is requesting to view the recorded asset 124 may be communicated to the ADS 112 and used by the ADS to determine ad assets 126 that may be relevant to the user/user segment and/or the video client 102/client device (e.g., some ads may be designated for viewing on certain types of devices).

In some examples, effectiveness of an ad asset 126 may be measured by a third-party system within a defined measurement window (e.g., 3 days beyond a program's initial broadcast, 7 days beyond a program's initial broadcast). This measurement window may be referred to as a C3/C7 window. During the C3/C7 window, some baked-in ads in a recorded asset 124 may be replaceable and other ads may not be replaceable based on the asset and according to POR-related information obtained from the POIS 114. For example, during the C3/C7 window, ad breaks 310 that are designated for national ads may not be replaced, while ad breaks 310 that are designated for local ads may be replaced. Accordingly, if playback of a recorded asset 124 is requested during the C3/C7 window, the ADS 112 may be configured to determine which ad breaks 310 are replaceable and to select ad assets 126 to replace the replaceable assets. This may enable the service provider to monetize content during the C3/C7 window with ad assets 126 that are targeted/relevant to the user.

According to an aspect, the ADS 112 may be configured to generate a first consolidated playlist 308 based on the placement decisions 312*a-d* and to provide the first consolidated playlist to the ADM 110 in a response message. For example, the first consolidated playlist 308 may comprise a sequential listing of the placement decisions 312*a-d*, which may reference the ad assets 126*a-h* selected for insertion in the reference asset 128, interspersed with references to the reference asset segments and the associated normal play time range 314*a-d* for each reference asset segment. The ADM 110 may be configured to provide the generated first consolidated playlist 308 to the manifest manipulator 106.

According to an aspect, the manifest manipulator 106 may receive the first consolidated playlist 308 and derive a second consolidated playlist (i.e., a master recorded asset playlist 316) for the recorded asset 124 from the first consolidated playlist. As part of generating the master recorded asset playlist 316 for dynamically inserting ads during playback of the recorded asset 124, the manifest manipulator 106 may request and obtain the recorded asset playlist 302 for the recorded asset 124 from the cDVR system 118 using the link (e.g., URL for) to the recorded asset 124 included in the playback request. In some examples and as illustrated, the example recorded asset playlist 302 may be a partial recording of content (e.g., the recording start time 320 begins after the start time of the broadcast content/corresponding reference asset 128). The recorded asset playlist 302 may include references to the various recorded segments of the recorded asset (recorded asset segments 306*a-b*) and the recorded ads (ad asset segments 304*a-d*) played during the broadcast of the recorded asset (e.g., when the recorded asset 124 was recorded). In an example aspect, the references to the recorded asset segments 306*a-b* and the ad asset segments 304*a-d* included in the recorded asset playlist 302 may be a sequential listing of .ts file URLs which would enable a video client 102 to fetch the associated .ts files and assemble the files for streaming the recorded asset 124 and the recorded ads.

The manifest manipulator 106 may be further configured to map the recording start time 320 and the recording end time 322 of the recorded asset 124 to their respective normal play time range 314 in the first consolidated playlist 308. Based on the recording start time 320 and the recording end time 322, the manifest manipulator 106 may filter out, from the first consolidated playlist 308, the ad placement decisions 312*a-b* outside of the recorded normal playtime range (e.g., the difference between the recording end time and the recording start time). The manifest manipulator 106 may be further configured to request links for the ad assets 126*d-h* included in the first consolidated playlist 308 within the normal play time range, and as part of generating the master playlist 316, replace the recorded ads (the .ts file URLs of the ad asset segments 304*a-d*) included in the recorded asset playlist 302 with the links for the ad assets 126 corresponding to the ad placement decisions 312*d-h* within the normal play time range.

According to an aspect, the manifest manipulator 106 may be further configured to transmit the master recorded asset playlist 316 to the cDVR system 118 and a link (e.g., URL) to the master recorded asset playlist to the video client 102. For example, the video client 102 can use the link to access the master recorded asset playlist 316 and to stream the recorded asset 124 and the inserted ad assets 126 per the playlist. In some examples, the original recorded asset playlist 302 may be persisted by the cDVR system 118, and the master recorded asset playlist 316 may be stored for a limited time period (e.g., for the duration of the playback session of the recorded asset 124 or for a predetermined time period after the playback session). For example, the master recorded asset playlist 316 may be deleted after the limited time period so that, upon subsequent playbacks of the recorded asset 124, up-to-date and relevant ad assets 126 may be dynamically selected and inserted into the recorded asset.

Figure 4:
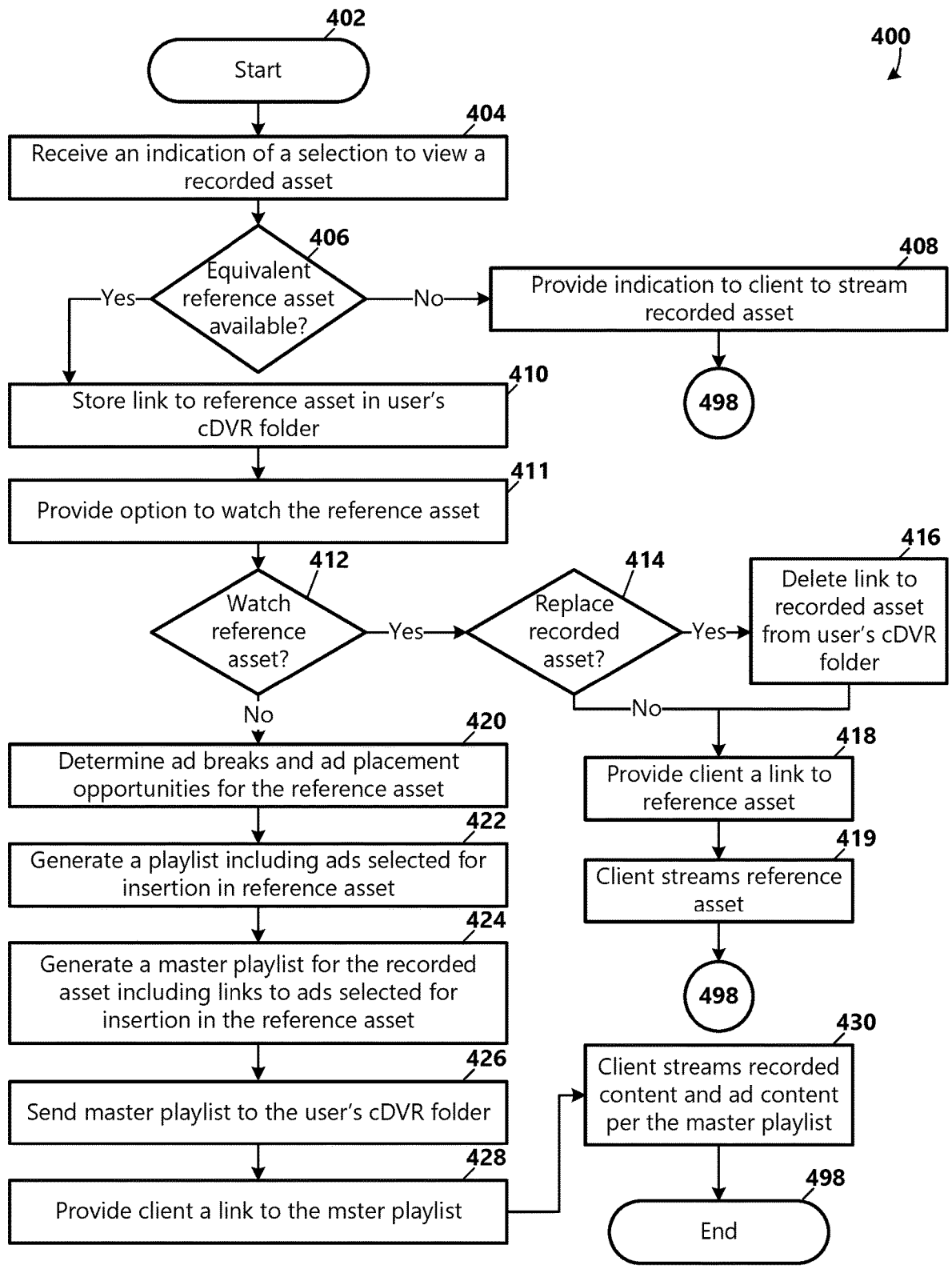
FIG. 4 is a flowchart depicting general stages of an example process for providing dynamic ad insertion in cloud-stored digitally-recorded content according to an embodiment.

FIG. 4 is a flow diagram that depicts general stages of an example method 400 for providing dynamic ad insertion in cloud-stored digitally-recorded content according to an embodiment. The method 400 starts at OPERATION 402, and proceeds to OPERATION 404, where a user of a video client 102 selects to view a recorded asset 124, wherein the recorded asset is a personal recording of video content stored in the user's folder in a cDVR system 118. A request for playback of the recorded asset 124 may be sent from the video client 102 to the cDVR manifest manipulator 106.

At DECISION OPERATION 406, the manifest manipulator 106 may determine whether there is an equivalent reference asset 128 corresponding to the recorded asset 124. For example, the manifest manipulator 106 may submit a query request to the asset manager 108 including the common ID 206 of the recorded asset. The asset manager 108 may maintain an index 202 that includes a mapping between a reference asset's common ID 206 and the asset's PID/PAID 208 and ad break metadata 212 for the asset. If a reference asset 128 corresponding to the common ID 206 does not exist in the reference asset CDN 122 (e.g., a VOD catalog), the asset manager 108 may provide a response to the manifest manipulator 106 indicating that there is not an equivalent reference asset 128, and at OPERATION 408, the manifest manipulator may provide an indication to the video client 102 to start streaming the recorded asset 124 from the cDVR system 118. If a reference asset 128 corresponding to the requested recorded asset 124 exists in the reference asset CDN 122 (e.g., a VOD catalog), the asset manager 108 may provide a response to the query request including the PID/PAID 208 and ad break metadata 212 for the asset, and at OPERATION 410, the manifest manipulator 106 may send a link to the reference asset 128 to the cDVR system 118 for storage in the user's cDVR folder. According to an aspect, lifecycle management may be applied to the reference asset 128 such that if the reference asset license window expires, prior to deleting the reference asset 128 from the system, a copy of the reference asset may be stored in the user's cDVR folder. At OPERATION 411, the manifest manipulator 106 may provide an option to the user (via the video client 102) to watch the reference asset 128 instead of the recorded asset 124.

At DECISION OPERATION 412, a determination may be made as to whether the user selects to watch the reference asset 128 instead of the recorded asset 124. If a response is received from the video client 102 indicating that the user opts to watch the reference asset 128, at DECISION OPERATION 414, another option may be provided to the user (via the video client 102) to replace the recorded asset 124 with the reference asset 128. If a response is received from the video client 102 indicating that the user opts to replace the recorded asset 124, at OPERATION 416, the link to the recorded asset 124 stored in the user's cDVR folder may be deleted. At OPERATION 418, the link to the reference asset 128 is sent to the video client 102, and at OPERATION 419, the video client 102 may use the link to access and stream the reference asset 128 for display to the user.

If, at DECISION OPERATION 412, a response is received from the video client 102 indicating that the user opts to watch the recorded asset 124 (i.e., not the reference asset 128), at OPERATION 420, the manifest manipulator 106 may send a request to the ADM 110 for an ad decision for the ad breaks 310 identified in the corresponding reference asset 128 (e.g., according to the ad break metadata 212 associated with the reference asset). The ADM 110 may send a request to the POIS 114 for POR-related information, and the POIS may respond to the request with information about the locations and rights associated with ad placement opportunities 105 within the reference asset 128 and an ad map for the reference asset. The ADM 110 may map the identified ad breaks 310 (e.g., pre-roll ad breaks, mid-roll ad breaks, post-roll ad breaks) in the reference asset 128 to the POR-related information received from the POIS 114.

At OPERATION 422, the ADM 110 may send a request to the ADS 112 for ad placement decisions 312 for the identified placement opportunities 305 in the reference asset 128. Responsive to the request, the ADS 112 may determine various ad assets 126 for insertion in the reference asset 128 based on any requirements, guidance, and targeting criteria (i.e., attributes and constraints) provided in the request. The ADS 112 may generate a first consolidated playlist 308 based on the placement decisions 312 and provide the first consolidated playlist to the ADM 110 in response to the ad placement decision request, and the ADM 110 may provide the generated first consolidated playlist 308 to the manifest manipulator 106.

At OPERATION 424, the manifest manipulator 106 may receive the first consolidated playlist 308 and use the first consolidated playlist to derive a second consolidated playlist (i.e., a master recorded asset playlist 316) for the recorded asset 124. For example, the manifest manipulator 106 may request and obtain the recorded asset playlist 302 for the recorded asset 124 from the cDVR system 118, and then map the recording start time 320 and the recording end time 322 of the recorded asset 128 to their respective normal play time range 314 in the first consolidated playlist 308. Based on the recording start time 320 and the recording end time 322, the manifest manipulator 106 may filter out the ad placement decisions 312 in the first consolidated playlist 308 outside of the recorded normal playtime range, request links for the ad assets 126 included in the first consolidated playlist 308 within the normal play time range, and replace the ads (the .ts file URLs of the ad asset segments 304) included in the recorded asset playlist 302 with the links for the ad assets 126 corresponding to the ad placement decisions 312 within the normal play time range.

At OPERATION 426, the manifest manipulator 106 may transmit the master recorded asset playlist 316 to the cDVR system 118, where the master recorded asset playlist 316 may be stored fora limited time period (e.g., for the duration of the playback session of the recorded asset 124 or for a predetermined time period after the playback session).

At OPERATION 428, a link (e.g., URL) to the master recorded asset playlist 316 to the video client 102, and at OPERATION 430, the video client 102 may use the link to access the master recorded asset playlist 316 and to stream the recorded asset 124 and the inserted ad assets 126 per the master playlist. For example, during playback of the recorded asset 124, the video client 102 may retrieve and play up-to-date and relevant ad assets 126 according to the master recorded asset playlist 316. The method 400 may end at OPERATION 498.

Figure 5:
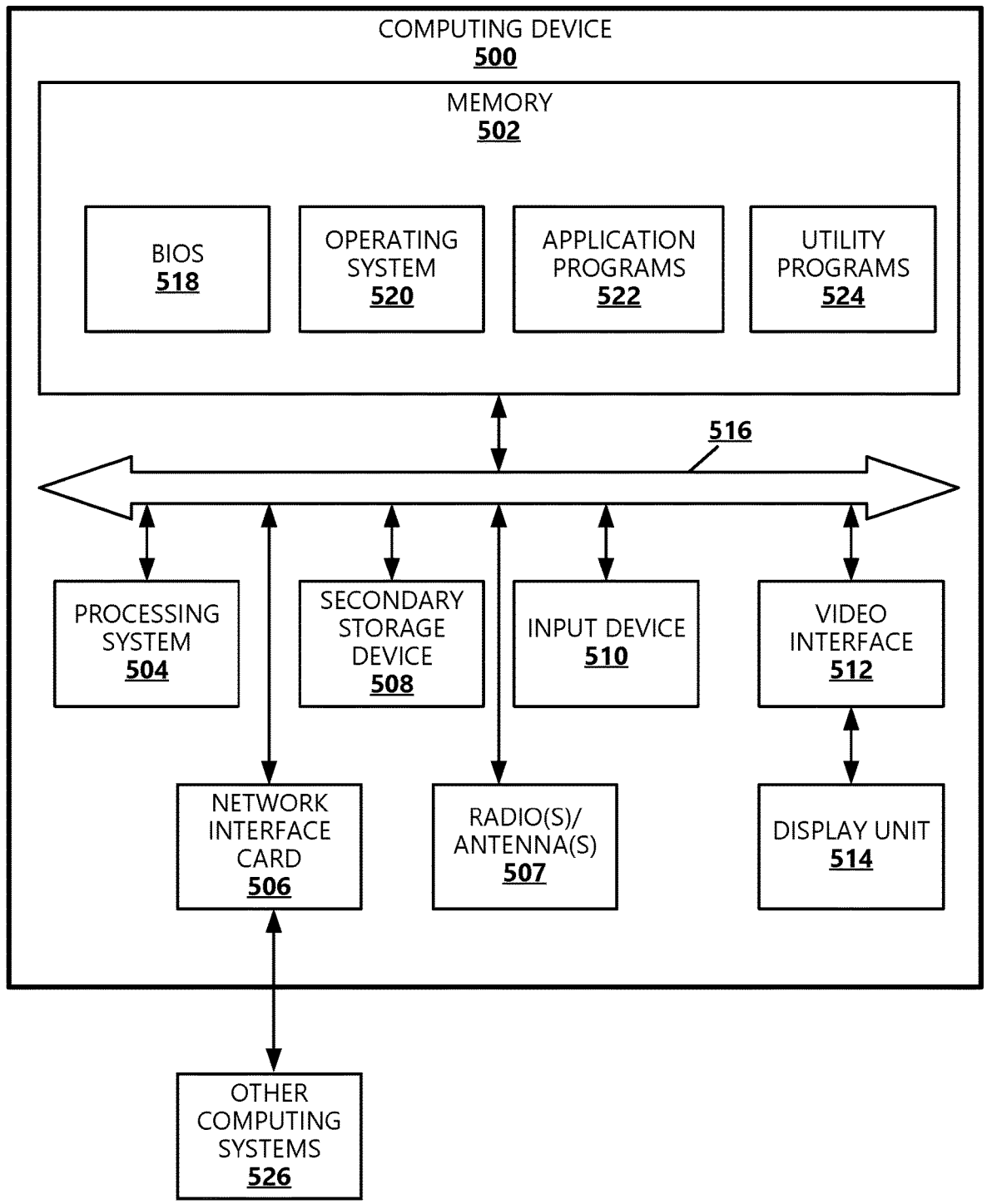
FIG. 5 is a block diagram illustrating example physical components of a computing device or system with which embodiments may be practiced.

FIG. 5 is a block diagram illustrating example physical components of a computing device 500 or system with which embodiments may be practiced. It should be appreciated that in other embodiments, different hardware components other than those illustrated in the example of FIG. 5 may be used. Computing devices may be implemented in different ways in different embodiments. For instance, in the example of FIG. 5, the computing device 500 includes a processing system 504, memory 502, a network interface 506 (wired and/or wireless), radio/antenna 507, a secondary storage device 508, an input device 510, a video interface 512, a display unit 514, and a communication medium 516. In other embodiments, the computing device 500 may be implemented using more or fewer hardware components (e.g., a video interface, a display unit, or an input device) or in combination with other types of computer systems and program modules 526.

The memory 502 includes one or more computer-readable storage media capable of storing data and/or computer-executable instructions. Memory 502 may store the computer-executable instructions that, when executed by processor 504, provide the manifest manipulator 106 according to an embodiment. In various embodiments, the memory 502 is implemented in various ways. For example, the memory 502 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 504 includes one or more processing units, which may include tangible integrated circuits that selectively execute computer-executable instructions. In various embodiments, the processing units in the processing system 504 are implemented in various ways. For example, the processing units in the processing system 504 can be implemented as one or more processing cores. In this example, the processing system 504 can comprise one or more microprocessors. In another example, the processing system 504 can comprise one or more separate microprocessors. In yet another example embodiment, the processing system 504 can comprise Application-Specific Integrated Circuits (ASICs) that provide specific functionality. In yet another example, the processing system 504 provides specific functionality by using an ASIC and by executing computer-executable instructions.

The computing device 500 may be enabled to send data to and receive data from a communication network via a network interface card 506. In different embodiments, the network interface card 506 is implemented in different ways, such as an Ethernet interface, a token-ring network interface, a fiber optic network interface, a wireless network interface (e.g., WIFI, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 508 includes one or more computer-readable storage media, and may store data and computer-executable instructions not directly accessible by the processing system 504. That is, the processing system 504 performs an I/O operation to retrieve data and/or computer-executable instructions from the secondary storage device 508. In various embodiments, the secondary storage device 508 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 510 enables the computing device 500 to receive input from a user. Example types of input devices include, but are not limited to, keyboards, mice, trackballs, stylus input devices, key pads, microphones, joysticks, touch-sensitive display screens, and other types of devices that provide user input to the computing device 500.

The video interface 512 outputs video information to the display unit 514. In different embodiments, the video interface 512 is implemented in different ways. For example, the video interface 512 is a video expansion card. In another example, the video interface 512 is integrated into a motherboard of the computing device 500. In various embodiments, the display unit 514 can be an LCD display panel, a touch-sensitive display panel, an LED screen, a projector, a cathode-ray tube display, or another type of display unit. In various embodiments, the video interface 512 communicates with the display unit 514 in various ways. For example, the video interface 512 can communicate with the display unit 514 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 516 facilitates communication among the hardware components of the computing device 500. In different embodiments, the communications medium 516 facilitates communication among different components of the computing device 500. For instance, in the example of FIG. 5, the communications medium 516 facilitates communication among the memory 502, the processing system 504, the network interface card 506, the secondary storage device 508, the input device 510, and the video interface 512. In different embodiments, the communications medium 516 is implemented in different ways, such as a PCI bus, a PCI Express bus, an accelerated graphics port (AGP) bus, an InfiniBand® interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 502 stores various types of data and/or software instructions. For instance, in the example of FIG. 5, the memory 502 stores a Basic Input/Output System (BIOS) 518, and an operating system 520. The BIOS 518 includes a set of software instructions that, when executed by the processing system 504, cause the computing device 500 to boot up. The operating system 520 includes a set of software instructions that, when executed by the processing system 504, cause the computing device 500 to provide an operating system that coordinates the activities and sharing of resources of the computing device 500. The memory 502 also stores one or more application programs or program code 522 that, when executed by the processing system 504, cause the computing device 500 to provide applications to users. The memory 502 also stores one or more utility programs 524 that, when executed by the processing system 504, cause the computing device 500 to provide utilities to other software programs.

Embodiments may be used in combination with any number of computer systems, such as in server environments, desktop environments, laptop or notebook computer systems, multiprocessor systems, micro-processor based or programmable consumer electronics, networked PCs, mini computers, main frame computers and the like. Embodiments may be utilized in various distributed computing environments where tasks are performed by remote processing devices that are linked through a communications network in a distributed computing environment, and where program code may be located in local and/or remote memory storage (e.g., memory and/or disk(s)).

All system components described herein may be communicatively coupled via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Infrared Data Association (IrDA), wireless, WAN technologies (T1, Frame Relay), Point-to-Point Protocol over Ethernet (PPoE), etc., including any combination thereof.

Figure 6:
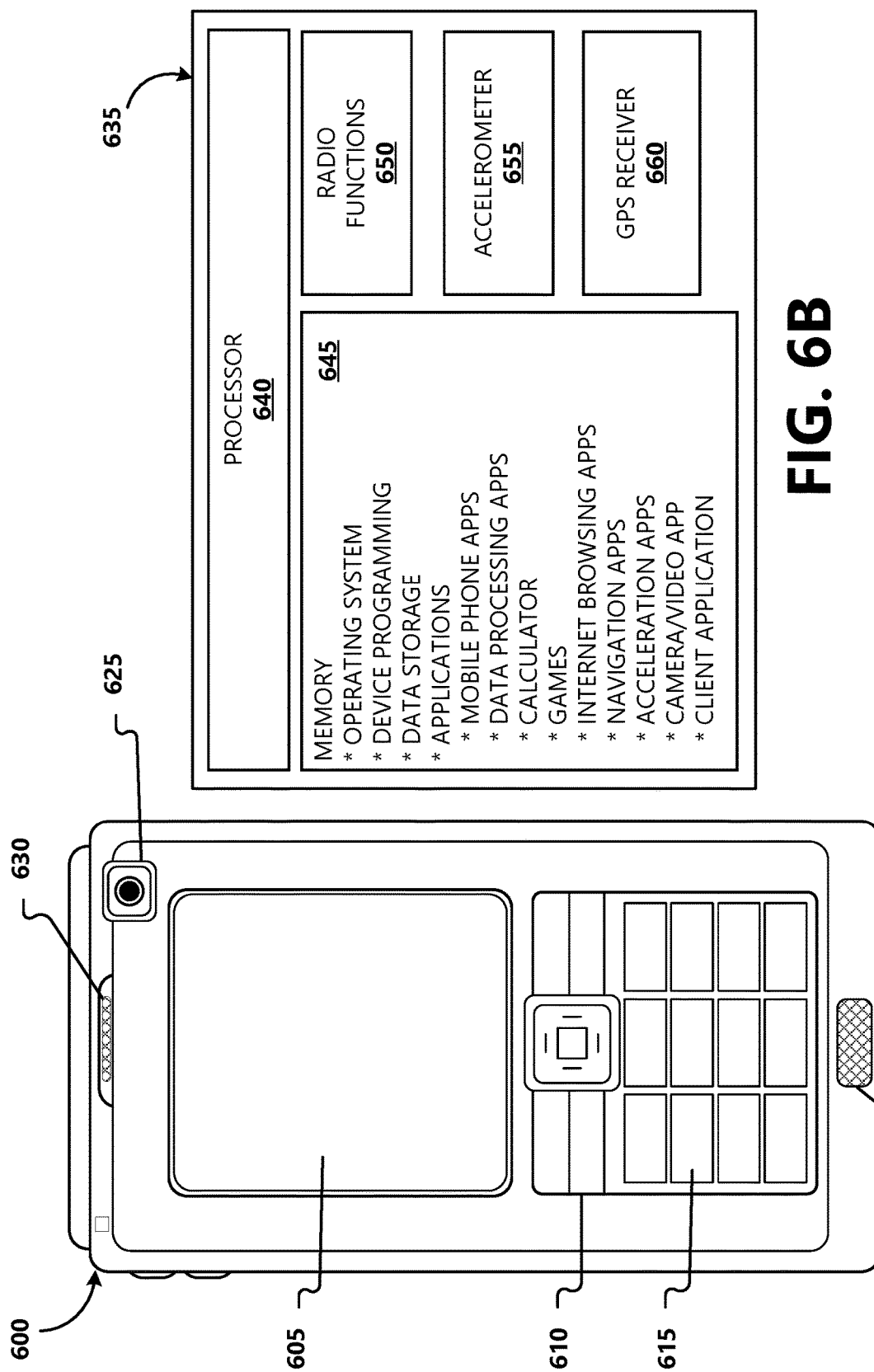
FIGS. 6A and 6B are block diagrams illustrating example physical components of a suitable mobile computing environment with which aspects of the present disclosure can be practiced.

FIGS. 6A-6B illustrate a suitable mobile computing device 600 or environment, for example, a mobile computing device or smart phone, a tablet personal computer, a laptop computer, or other computing device, with which aspects can be practiced. The mobile computing device 600 is illustrative of any suitable device operative to send, receive and process wireless communications. A display screen 605 is operative for displaying a variety of information such as information about incoming and outgoing communications, as well as, a variety of data and displayable objects, for example, text, alphanumeric data, photographs, and the like.

Data input to the mobile computing device 600 can be performed via a variety of suitable means, such as, touch screen input via the display screen 605, keyboard or keypad input via a data entry area 610, key input via one or more selectable buttons or controls 615, voice input via a microphone 618 disposed on the mobile computing device 600, photographic input via a camera 625 functionality associated with the mobile computing device 600, or any other suitable input means. Data can be output via the mobile computing device 600 via any suitable output means, including but not limited to, display on the display screen 605, audible output via an associated speaker 630 or connected earphone system, vibration module for providing tactile output, and the like.

Referring now to FIG. 6B, operational unit 635 is illustrative of internal operating functionality of the mobile computing device 600. A processor 640 is illustrative of a computer processor for processing incoming and outgoing data and communications and controlling operation of the device and associated software applications via a mobile computing device operating system. Memory 645 can be utilized for storing a device operating system, device programming, one or more stored applications, for example, mobile telephone applications, data processing applications, calculators, games, Internet browsing applications, navigation applications, acceleration applications, camera and/or video applications, etc.

Mobile computing device 600 can contain an accelerometer 655 for detecting acceleration, and can be used to sense orientation, vibration, and/or shock. Mobile computing device 600 can contain a global positioning system (GPS) system (e.g., GPS send/receive functionality) 660. A GPS system 670 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 650 include all required functionality, including onboard antennae, for allowing the mobile computing device 600 to communicate with other communication devices and systems via a wireless network. Radio functions 650 can be utilized to communicate with a wireless or WIFI-based positioning system to determine a device location.

FIG. 7 is a block diagram illustrating a cable television services system 700 (hereafter referred to as "CATV") architecture providing an operating environment according to an aspect. Referring now to FIG. 7, digital and analog video programming, information content, and interactive television services are provided via a hybrid fiber coax (HFC) network 715 to a television set 716 for consumption by a cable television/services system customer. As is known to those skilled in the art, HFC networks 715 combine both optical fiber and coaxial cable lines. Typically, optical fiber runs from the cable head end 710 to neighborhoods of subscribers. Coaxial cable runs from the optical fiber feeders to each customer or subscriber. The functionality of the HFC network 715 allows for efficient bidirectional data flow between the set-top box 718 and the application server 740 of the aspect.

The CATV system 700 is in the form of a distributed client-server computing system for providing video and data flow across the HFC network 715 between server-side services providers (e.g., cable television/services providers) via a server-side head end 710 and a client-side customer via a set-top box (STB) 718 functionally connected to a customer receiving device, such as the television set 716. As is understood by those skilled in the art, modern CATV systems 700 can provide a variety of services across the HFC network 715 including traditional digital and analog video programming, telephone services, high speed Internet access, video-on-demand, and services.

On the client side of the CATV system 700, digital and analog video programming and digital and analog data are provided to the customer television set 716 via the STB 718. Interactive television services that allow a customer to input data to the CATV system 700 likewise are provided by the STB 718. As illustrated in FIG. 7, the STB 718 is a multipurpose computing device having a computer processor, memory, and an input/output mechanism. The input/output mechanism receives input from server-side processes via the HFC network 715 and from customers via input devices such as a remote control device 728, keyboard 730, or other computing device, such as a tablet/slate computer, smart phone, etc. The remote control device 728 and the keyboard 730 can communicate with the STB 718 via a suitable communication transport such as the infrared connection 732. The remote control device 728 can include a biometric input module 729. The STB 718 also includes a video processor for processing and providing digital and analog video signaling to the television set 716 via a cable communication transport 734. A multi-channel tuner is provided for processing video and data to and from the STB 718 and the server-side head end system 710, described below.

The STB 718 also includes an operating system 722 for directing the functions of the STB 718 in conjunction with a variety of client applications 725. For example, if a client application 725 requires a news flash from a third-party news source to be displayed on the television 716, the operating system 722 can cause the graphics functionality and video processor of the STB 718, for example, to output the news flash to the television 716 at the direction of the client application 725 responsible for displaying news items.

Because a variety of different operating systems 722 can be utilized by a variety of different brands and types of set-top boxes 718, a middleware layer 724 can be provided to allow a given software application to be executed by a variety of different operating systems. According to an embodiment, the middleware layer 724 can include a set of application programming interfaces (APIs) that are exposed to client applications and operating systems 722 that allow client applications 725 to communicate with the operating systems 722 through common data calls understood via the API set. As described below, a corresponding middleware layer 742 is included on the server side of the CATV system 700 for facilitating communication between the server-side application server and the client-side STB 718. The middleware layer 742 of the server-side application server and the middleware layer 724 of the client-side STB 718 can format data passed between the client side and server side according to the Extensible Markup Language (XML).

According to one aspect, the STB 718 passes digital and analog video and data signaling to the television 716 via a one-way communication transport 734. According to other aspects, two-way communication transports can be utilized, for example, via high definition multimedia (HDMI) ports. The STB 718 can receive video and data from the server side of the CATV system 700 via the HFC network 715 through a video/data downlink and data via a data downlink. The STB 718 can transmit data from the client side of the CATV system 700 to the server side of the CATV system 700 via the HFC network 715 via one data uplink. The video/data downlink is an "in band" downlink that allows for digital and analog video and data signaling from the server side of the CATV system 700 through the HFC network 715 to the STB 718 for use by the STB 718 and for distribution to the television set 716. As is understood by those skilled in the art, the "in band" signaling space operates at a relative high frequency, e.g., between 54 and 1000 megahertz. The signaling space is generally divided into 6 megahertz channels in which can be transmitted as a single analog signal or a greater number (e.g., ten) of digital signals.

The data downlink and the data uplink, illustrated in FIG. 7, between the HFC network 715 and the set-top box 718 comprise "out of band" data links. As is understand by those skilled in the art, the "out of band" frequency range is generally at a lower frequency than "in band" signaling. For example, the "out of band" frequency range can be between zero and 54 megahertz. Data flow between the STB 718 and the server-side application server 740 is typically passed through the "out of band" data links. Alternatively, an "in band" data carousel can be positioned in an "in band" channel into which a data feed can be processed from the application server 740 through the HFC network 715 to the STB 718. Operation of data transport between components of the CATV system 700, described with reference to FIG. 7, is well known to those skilled in the art.

Referring still to FIG. 7, the head end 710 of the CATV system 700 is positioned on the server side of the CATV system and includes hardware and software systems responsible for originating and managing content for distributing through the HFC network 715 to client-side STBs 718 and other computing devices 702 for presentation to customers. As described above, a number of services can be provided by the CATV system 700, including digital and analog video programming, interactive television services, telephone services, video-on-demand services, targeted advertising, and/or provision of supplemental content.

The application server 740 can be configured as a computing system operative to assemble and manage data sent to and received from the STB 718 via the HFC network 715. As described above, the application server 740 includes a middleware layer 742 for processing and preparing data from the head end 710 of the CATV system 700 for receipt and use by the client-side STB 718. For example, the application server 740 via the middleware layer 742 can obtain supplemental content from third-party services 746 via the Internet 744 for transmitting to a customer through the HFC network 715, the STB 718, and recording by a local or remote DVR. For example, content metadata from a third-party content provider service can be downloaded by the application server 740 via the Internet 744. When the application server 740 receives the downloaded content metadata, the middleware layer 742 can be utilized to format the content metadata for receipt and use by the STB 718. Therefore, content metadata can be sent and categorized based on the availability to the customer's program guide data.

According to one embodiment, data obtained and managed by the middleware layer 742 of the application server 740 is formatted according to the Extensible Markup Language and is passed to the STB 718 through the HFC network 715 where the XML-formatted data can be utilized by a client application 725 in concert with the middleware layer 724, as described above. As should be appreciated by those skilled in the art, a variety of third-party services data 746, including news data, weather data, sports data and other information content can be obtained by the application server 740 via distributed computing environments such as the Internet 744 for provision to customers via the HFC network 715 and the STB 718.

According to aspects, the application server 740 obtains customer support services data, including billing data, information on customer work order status, answers to frequently asked questions, services provider contact information, and the like from data services 726 for provision to the customer via an interactive television session. The data services 726 include a number of services operated by the services provider of the CATV system 700 which can include profile and other data associated with a given customer.

A billing system 764 can include information such as a customer's name, street address, business identification number, Social Security number, credit history, and information regarding services and products subscribed to by the customer. According to embodiments, the billing system 764 can also include billing data for services and products subscribed to by the customer for bill processing, billing presentment and payment receipt.

A customer information database 768 can include general information about customers such as place of employment, business address, business telephone number, and demographic information such as age, gender, educational level, and the like. The customer information database 768 can also include information on pending work orders for services or products ordered by the customer. The customer information database 768 can also include general customer information such as answers to frequently asked customer questions and contact information for various service provider offices/departments. As should be understood, this information can be stored in a variety of disparate databases operated by the cable services provider.

Referring still to FIG. 7, web services system 750 is illustrated between the application server 740 and the data services 726. According to aspects, web services system 750 serves as a collection point for data requested from each of the disparate data services systems comprising the data services 726. According to aspects, when the application server 740 requires customer services data from one or more of the data services 726, the application server 740 passes a data query to the web services system 750. The web services system 750 formulates a data query to each of the available data services systems for obtaining any required data for a requesting customer as identified by a set-top box identification associated with the customer.

The web services system 750 serves as an abstraction layer between the various data services systems and the application server 740. That is, the application server 740 is not required to communicate with the disparate data services systems, nor is the application server 740 required to understand the data structures or data types utilized by the disparate data services systems. The web services system 750 is operative to communicate with each of the disparate data services systems for obtaining necessary customer data. The customer data obtained by the web services system is assembled and is returned to the application server 740 for ultimate processing via the middleware layer 742, as described above. An authentication system 766 can include information such as secure user names, subscriber profiles, subscriber IDs, and passwords utilized by customers for access to network services. As should be understood by those skilled in the art, the disparate systems 750, 764, 766, 768 can be integrated or provided in any combination of separate systems, wherein FIG. 7 shows only one example.

Aspects, for example, are described above with reference to block diagrams and/or operational illustrations of methods, systems, and computer program products according to embodiments. The functions/acts noted in the blocks can occur out of the order as shown in any flowchart or described herein. For example, two processes shown or described in succession can in fact be executed substantially concurrently or the blocks can sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media. Further, the disclosed processes may be modified in any manner, including by reordering and/or inserting or deleting a step or process, without departing from the embodiments.

The foregoing description has been presented for the purposes of illustration and description. It is not intended to be exhaustive or to limit the embodiments to the precise forms disclosed. Many modifications and variations are possible in light of the above teaching. It is intended that the scope of the invention be limited not with this detailed description, but rather by the claims appended hereto.

We claim:

1. A system for providing dynamic ad insertion in a cloud-based digital video recorder (cDVR) asset, the system comprising:
  at least one processor;
  a memory storage device including instructions that when executed by the at least one processor:
    receive an indication to playback a recorded asset via a video client, wherein the recorded asset is stored in a cDVR storage as a personal recording of a program that includes secondary content that was recorded when the recorded asset was recorded;
    associate the recorded asset with a corresponding reference asset, wherein the corresponding reference asset is a video-on-demand (VOD) copy of the program that includes ad breaks, the system to:

map a common identifier of the recorded asset to a provider identifier/provider asset identifier of the corresponding reference asset; and obtain content metadata and ad break metadata associated with the corresponding reference asset;

provide the content metadata and the ad break metadata associated with the corresponding reference asset to an ad decisioning manager to enable the ad decisioning manager to:

obtain placement opportunity-related information associated with the corresponding reference asset;

map the placement opportunity-related information to the ad breaks included in the corresponding reference asset;

request, from an ad decisioning service, ad decisions for the ad breaks based on the placement opportunity-related information; and obtain a first consolidated playlist responsive to the request including the ad decisions for the ad breaks included in the corresponding reference asset;

generate a second consolidated playlist for the recorded asset that maps the ad breaks in the corresponding reference asset to the recorded asset to enable ads to be dynamically inserted into the recorded asset in place of the secondary content that was recorded when the recorded asset was recorded, wherein the second consolidated playlist includes links to the recorded asset and links to ad assets corresponding to the ad decisions included in the first consolidated playlist;

store the second consolidated playlist in the cDVR storage; and provide a link to the second consolidated playlist to the video client for enabling the video client to stream the recorded asset and the ad assets per the second consolidated playlist.

2. The system of claim 1, wherein the common identifier is a unique identifier that is known based on electronic program guide data and recorded in association with the recorded asset.

3. The system of claim 1, wherein:

the recorded asset is a partial recording of the program; and as part of generating the second consolidated playlist, the system is further configured to:

obtain a playlist of the recorded asset from the cDVR storage;

map a recording start time and a recording end time to their respective normal play time range in the first consolidated playlist;

filter out, from the first consolidated playlist, ad decisions for ad breaks outside the normal play time range; and substitute ad assets referenced in the playlist of the recorded asset with links to the ad assets corresponding to the ad decisions included in the first consolidated playlist.

4. The system of claim 1 configured to store the second consolidated playlist for a limited time period, wherein the limited time period comprises one of:

a duration of playback of the recorded asset; or a predetermined time period after a playback session.

5. The system of claim 4, wherein the system is configured to persist storage of the playlist of the recorded asset in the cDVR storage.

6. The system of claim 1, wherein prior to the request for the ad decisions for the corresponding reference asset, the system is configured to:

store a link to the corresponding reference asset in the cDVR storage;

provide a first option to playback the corresponding reference asset instead of the recorded asset;

receive a selection to playback the corresponding reference asset; and provide the link to the corresponding reference asset to the video client for enabling the video client to stream the corresponding reference asset and ad assets for display according to a reference asset playlist.

7. The system of claim 6, wherein:

in providing the link to the corresponding reference asset to the video client, the system is further configured to:

obtain the ad decisions for the ad breaks associated with the corresponding reference asset;

generate the reference asset playlist for playback of the corresponding reference asset, the playlist including links to the corresponding reference asset and links to ad assets corresponding to the ad decisions; and provide a link to the reference asset playlist.

8. The system of claim 6, wherein responsive to receiving the selection to playback the corresponding reference asset, the system is further configured to:

provide a second option to replace the recorded asset with the corresponding reference asset;

receive a selection to replace the recorded asset with the corresponding reference asset; and delete the recorded asset from the cDVR storage.

9. A system for providing dynamic ad insertion in a cloud-based digital video recorder (cDVR) asset, the system comprising:

at least one processor;

a memory storage device including instructions that when executed by the at least one processor:

receive an indication of a selection to playback a recorded asset via a video client, wherein the recorded asset is a personal recording of program that includes secondary content that was recorded when the recorded asset was recorded stored in a cDVR storage;

associate the recorded asset with a corresponding reference asset, wherein the corresponding reference asset is a video-on-demand (VOD) copy of the program;

provide a first option to playback the corresponding reference asset or the recorded asset;

in response to a selection to playback the corresponding reference asset:

provide a link to the corresponding reference asset to the video client for enabling the video client to stream the corresponding reference asset and ad assets per a reference asset playlist;

provide a second option to replace the recorded asset with the corresponding reference asset;

in response to a selection of the second option to replace the recorded asset with the corresponding reference asset:

store the link to the corresponding reference asset in the cDVR storage; and delete the recorded asset from the cDVR storage;

in response to receiving an indication of an expiration date of a license window associated with the corresponding reference asset:

store a copy of the corresponding reference asset in the cDVR storage prior to the expiration date; and delete the link to the corresponding reference asset from the cDVR storage;

in response to a selection to playback the recorded asset:

request an ad decision for the corresponding reference asset;

responsive to the request, receive a first consolidated playlist including ad decisions for ad breaks included in the corresponding reference asset;

generate a second consolidated playlist for the recorded asset that maps the ad breaks in the corresponding reference asset to the recorded asset to enable ads to be dynamically inserted into the recorded asset in place of the secondary content that was recorded when the recorded asset was recorded, wherein the second consolidated playlist includes links to the recorded asset and links to ad assets corresponding to the ad decisions included in the first consolidated playlist;

store the second consolidated playlist in the cDVR storage; and provide a link to the second consolidated playlist to the video client for enabling the video client to stream the recorded asset and the ad assets per the second consolidated playlist.

10. The system of claim 9, wherein in associating the recorded asset with the corresponding reference asset, the system is configured to:

map a common identifier of the recorded asset to a provider identifier/provider asset identifier of the corresponding reference asset; and obtain content metadata and ad break metadata associated with the corresponding reference asset.

11. The system of claim 10, further configured to:

provide the content metadata and ad break metadata associated with the corresponding reference asset to an ad decisioning manager for enabling the ad decisioning manager to:

obtain placement opportunity-related information associated with the corresponding reference asset;

map the placement opportunity-related information to the ad breaks included in the corresponding reference asset;

request, from an ad decisioning service, ad decisions for the ad breaks based on the placement opportunity-related information; and obtain the first consolidated playlist responsive to the request.

12. The system of claim 9, wherein:

the recorded asset is a partial recording of the program; and to generate the second consolidated playlist, the system is further configured to:

obtain a playlist of the recorded asset from the cDVR storage;

map a recording start time and a recording end time to their respective normal play time range in the first consolidated playlist;

filter out, from the first consolidated playlist, ad decisions for ad breaks outside the normal play time range; and substitute ad assets referenced in the playlist of the recorded asset with links to the ad assets corresponding to the ad decisions included in the first consolidated playlist.

13. A method for providing dynamic ad insertion, the method comprising:

receiving an indication to playback a recorded asset via a video client, wherein the recorded asset is a partial recording of a program that includes secondary content that was recorded when the recorded asset was stored in a cDVR storage;

associating the recorded asset with a corresponding reference asset, wherein the corresponding reference asset is a video-on-demand (VOD) copy of the program;

storing a link to the corresponding reference asset in the cDVR storage;

providing a first option to playback the corresponding reference asset instead of the recorded asset; and in response to a selection to playback the corresponding reference asset according to the first option, providing the link to the corresponding reference asset to the video client for enabling the video client to access and stream the corresponding reference asset for display;

in response to a selection to not playback the corresponding reference asset according to the first option:

requesting an ad decision for the corresponding reference asset;

responsive to the request, receiving a first consolidated playlist including ad decisions for ad breaks included in the corresponding reference asset;

generating a second consolidated playlist for the recorded asset that maps the ad breaks in the corresponding reference asset to the recorded asset to enable ads to be dynamically inserted into the recorded asset in place of the secondary content that was recorded when the recorded asset was recorded, wherein the second consolidated playlist includes links to the recorded asset and links to ad assets corresponding to the ad decisions included in the first consolidated playlist, wherein generating the second consolidated playlist further comprises:

obtaining a playlist of the recorded asset from the cDVR storage;

mapping a recording start time and a recording end time to their respective normal play time range in the first consolidated playlist;

filtering out, from the first consolidated playlist, ad decisions for ad breaks outside the normal play time range; and substituting ad assets referenced in the playlist of the recorded asset with links to the ad assets corresponding to the ad decisions included in the first consolidated playlist; and storing the second consolidated playlist in the cDVR storage; and providing a link to the second consolidated playlist to the video client for enabling the video client to stream the recorded asset and the ad assets per the second consolidated playlist.

14. The method of claim 13, wherein in response to selection to playback the corresponding reference asset:

providing a second option to replace the recorded asset with the corresponding reference asset; and in response to selection of the second option, deleting the recorded asset from the cDVR storage.

* * * * *